(12) United States Patent
Saubhasik et al.

(10) Patent No.: US 11,818,034 B1
(45) Date of Patent: Nov. 14, 2023

(54) HARDWARE BACKUP FAILURE MECHANISM FOR MULTIPATH NEXT HOP SHRINKING

(71) Applicant: Arista Networks, Inc., Santa Clara, CA (US)

(72) Inventors: Mayukh Saubhasik, Richmond (CA); Tim Tang, Burnaby (CA); Bhavin Rameshbhai Patel, Milpitas, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/728,103

(22) Filed: Apr. 25, 2022

(51) Int. Cl.
*H04L 12/707* (2013.01)
*H04L 12/703* (2013.01)
*H04L 45/17* (2022.01)
*H04L 45/00* (2022.01)
*H04L 45/28* (2022.01)

(52) U.S. Cl.
CPC .............. *H04L 45/17* (2022.05); *H04L 45/22* (2013.01); *H04L 45/28* (2013.01)

(58) Field of Classification Search
CPC ....... H04L 45/22; H04L 45/24; H04L 45/247; H04L 45/28
See application file for complete search history.

(56) References Cited

U.S. PATENT DOCUMENTS

| | | | |
|---|---|---|---|
| 8,995,301 B1* | 3/2015 | Miller | H04L 45/14 370/338 |
| 2017/0099180 A1* | 4/2017 | Singh | H04L 12/4641 |
| 2018/0302321 A1* | 10/2018 | Manthiramoorthy | H04L 12/4641 |
| 2018/0351882 A1* | 12/2018 | Jeganathan | H04L 12/4641 |
| 2021/0044516 A1* | 2/2021 | Sellappa | H04L 45/02 |
| 2022/0210048 A1* | 6/2022 | Dutta | H04L 45/12 |
| 2022/0303209 A1* | 9/2022 | Zou | H04W 40/04 |
| 2023/0037516 A1* | 2/2023 | Ji | H04L 63/20 |

OTHER PUBLICATIONS

Paluch et al., "How does a router know when a next hop (ethernet) is down?"—CISCO Community (Year: 2015).*

* cited by examiner

*Primary Examiner* — Boris D Grijalva Lobos
(74) *Attorney, Agent, or Firm* — Tianyi He

(57) ABSTRACT

A method for processing packets in a network device, comprising: determining that a packet received by the network device is to be processed using a next hop group, selecting a member of the next hop group, and transmitting the packet to a second network device associated with a second member of the next hop group.

20 Claims, 9 Drawing Sheets

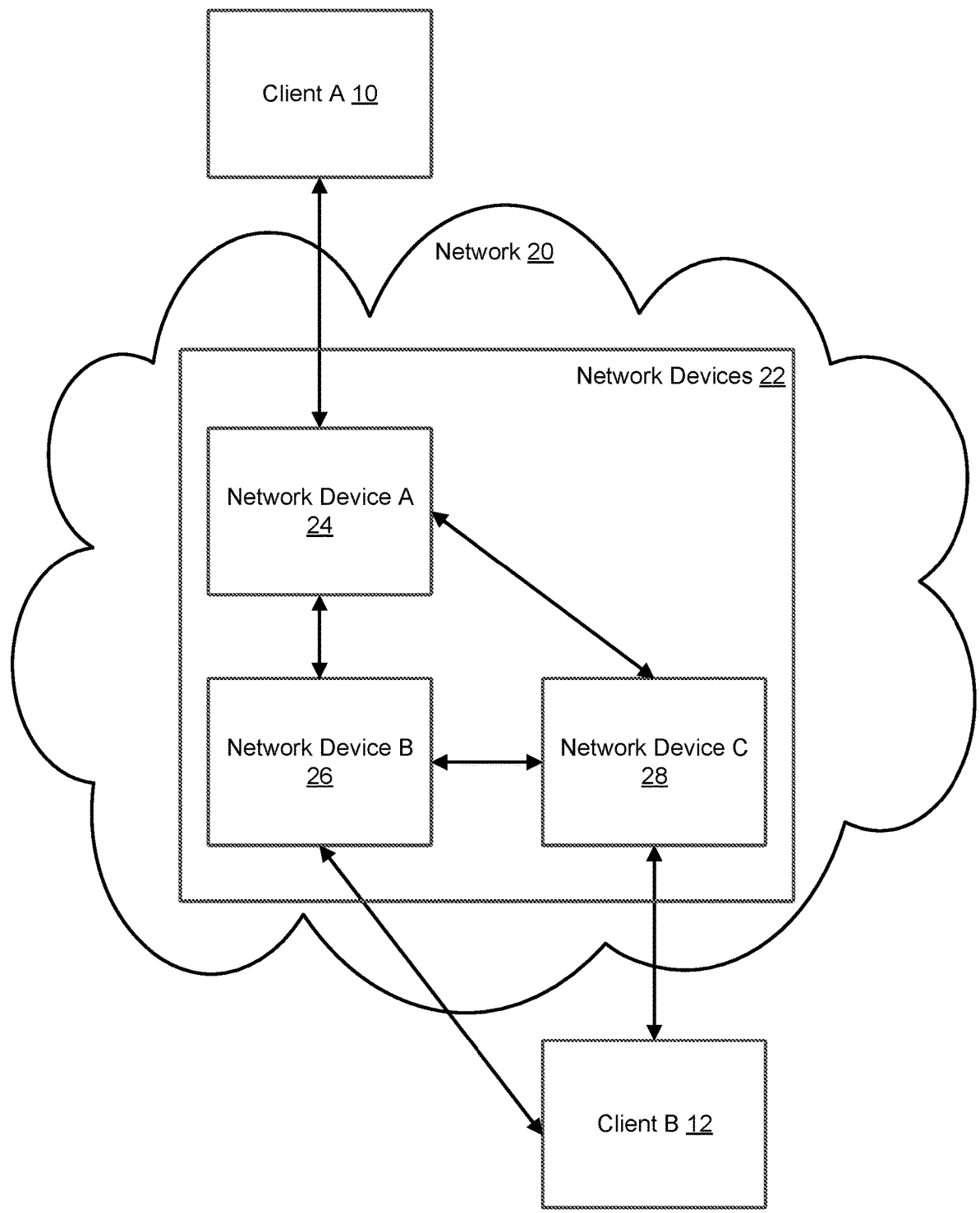
FIG. 1.1

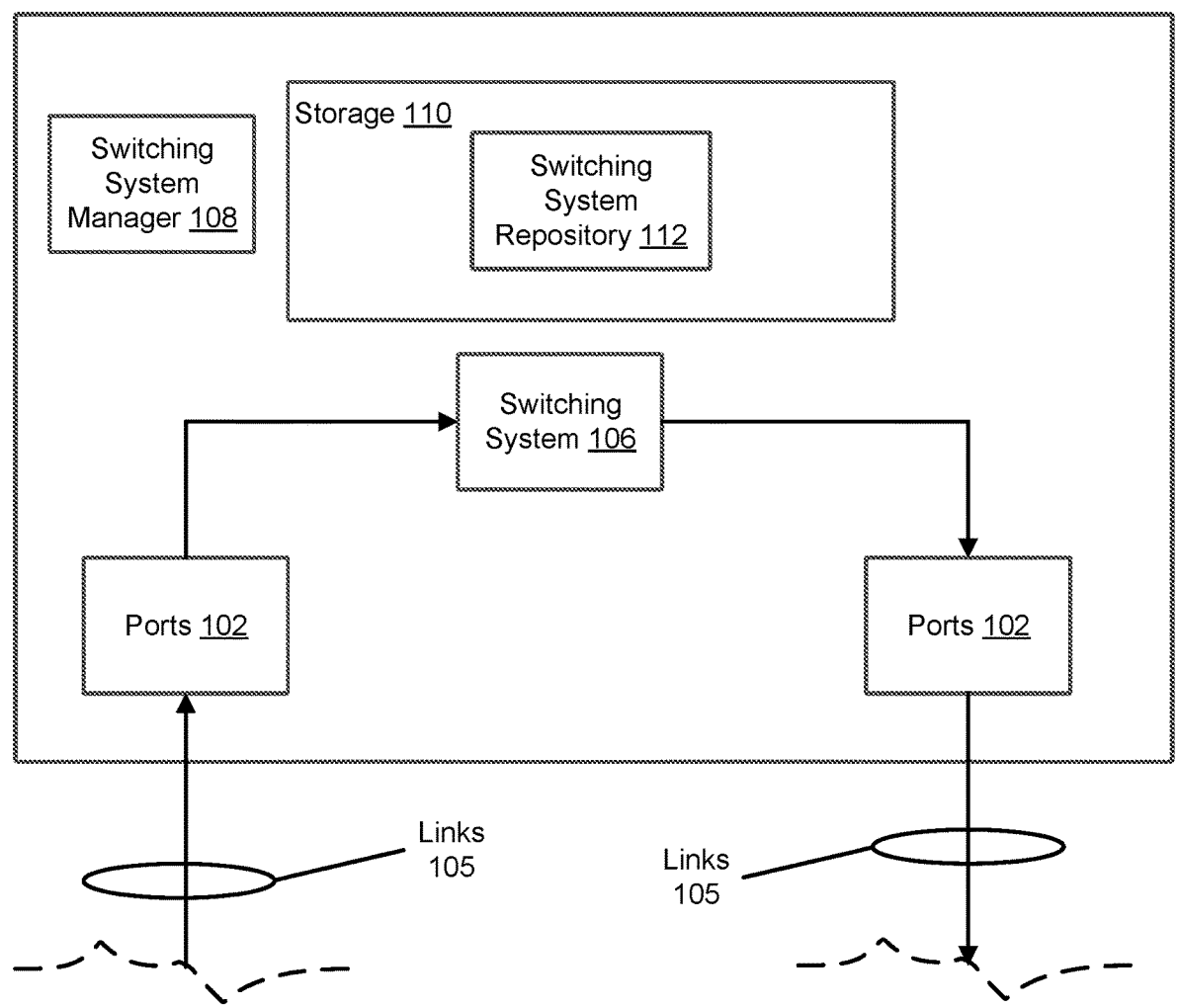
FIG. 1.2

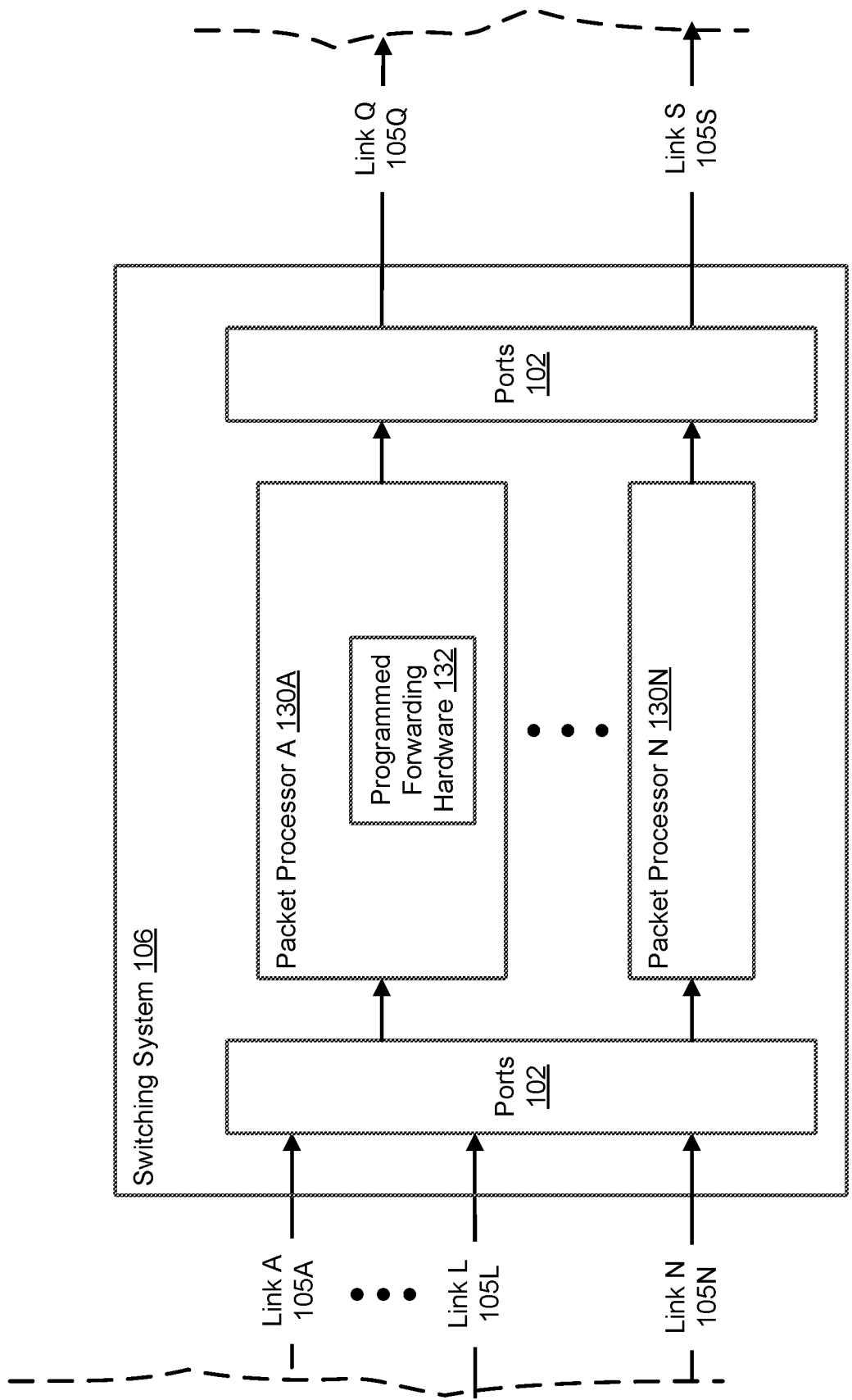
FIG. 1.3

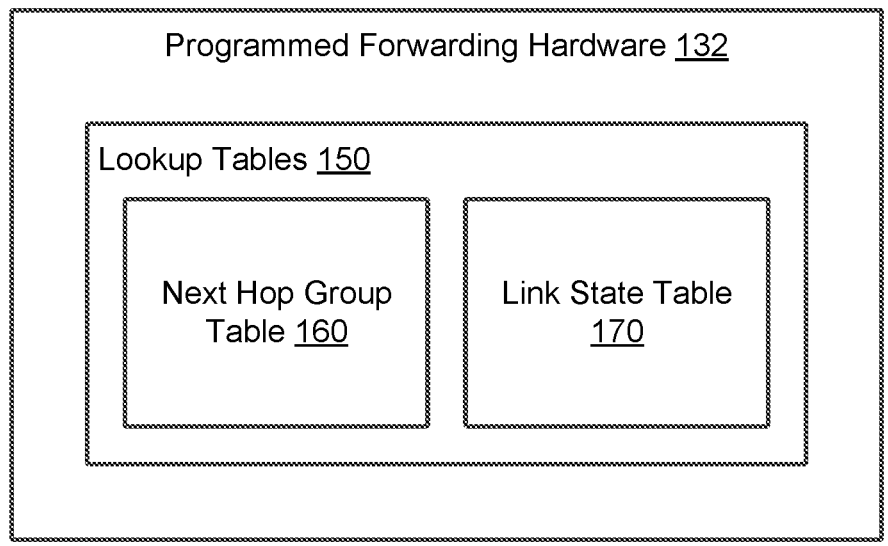
FIG. 1.4

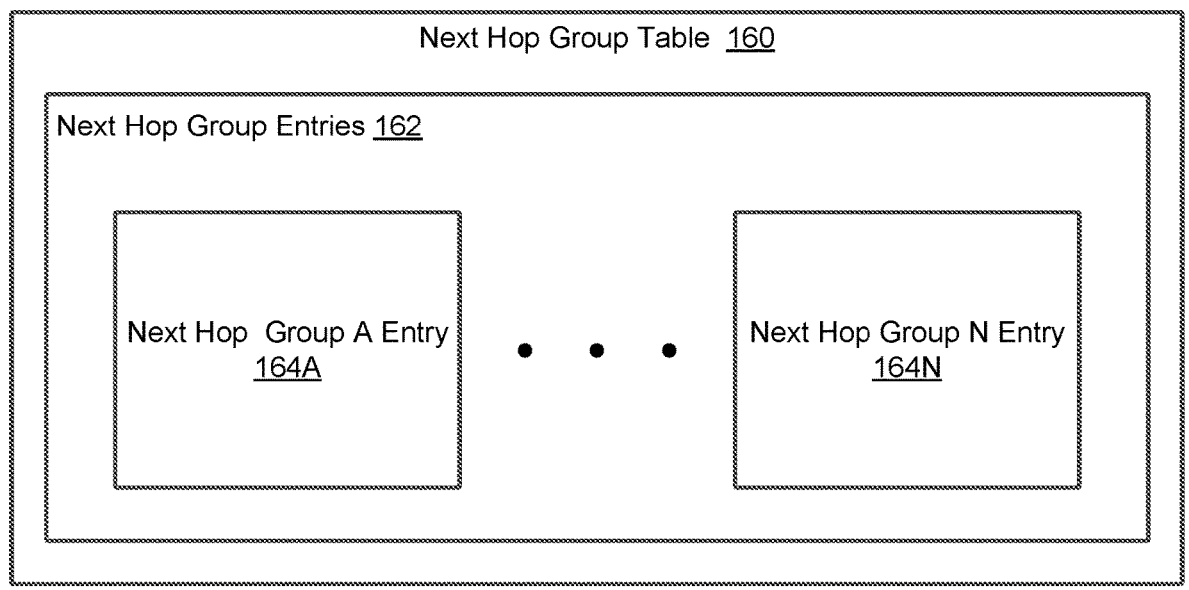
FIG. 1.5

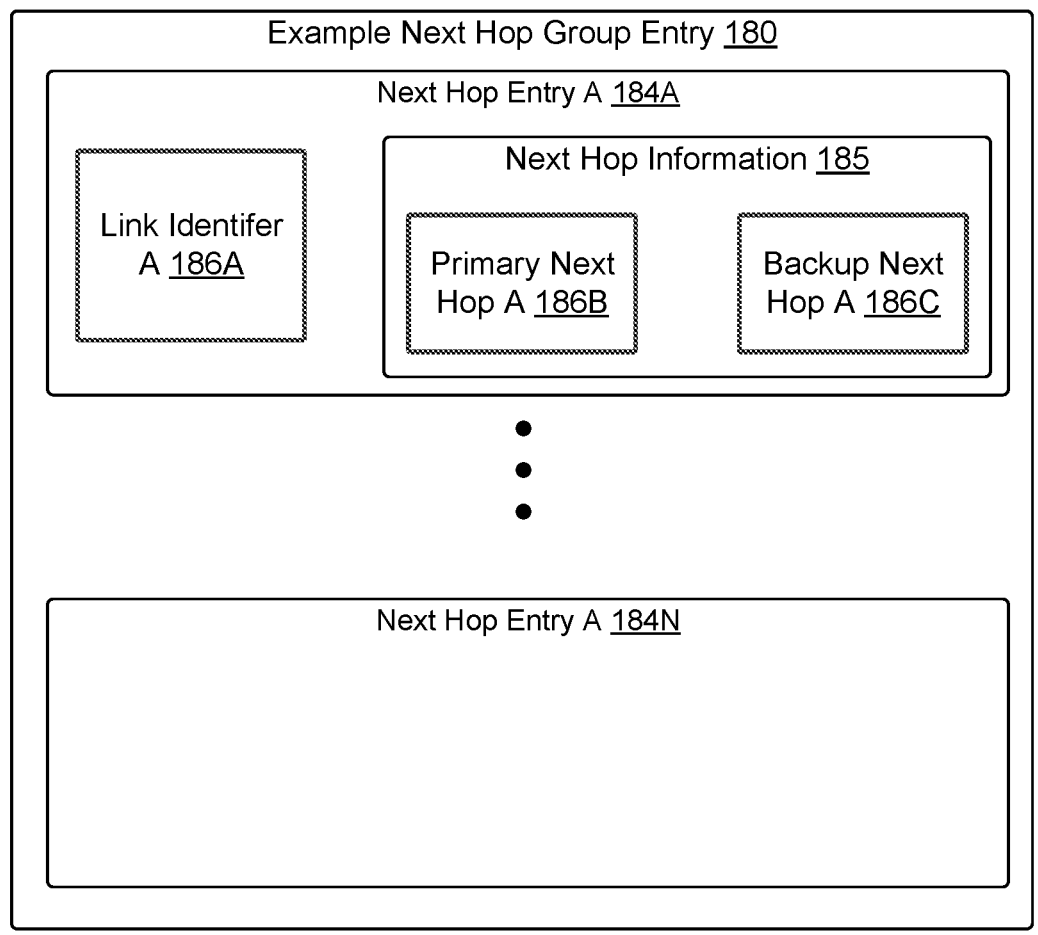
FIG. 1.6

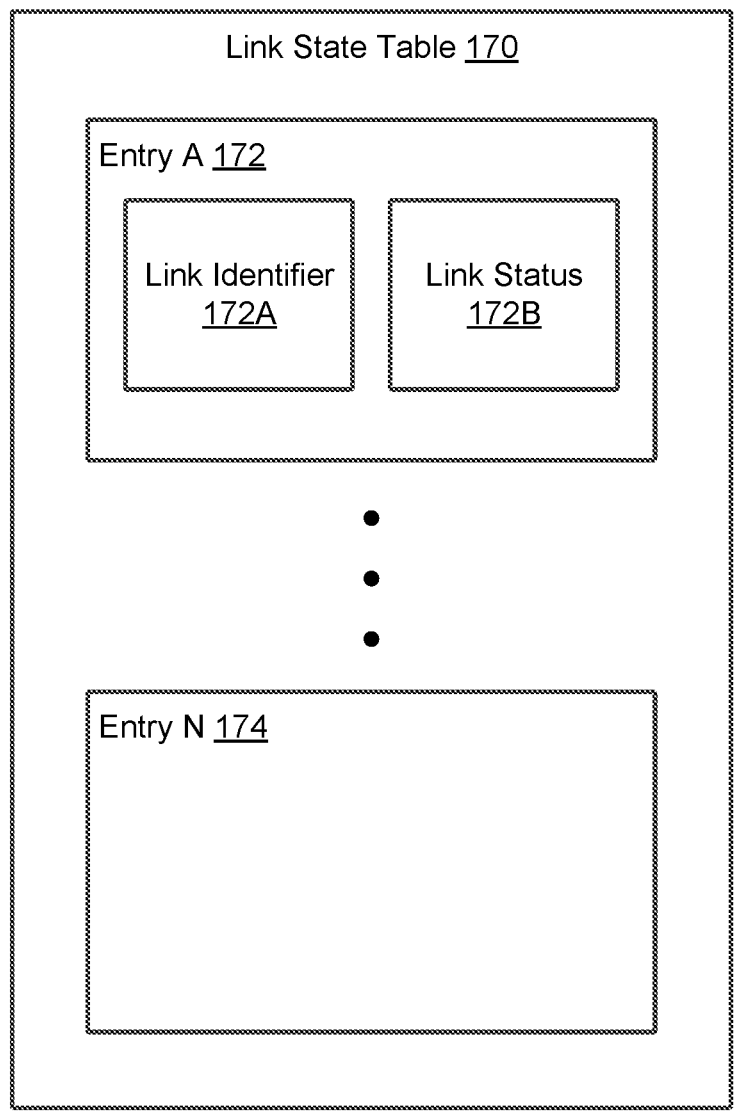
FIG. 1.7

HARDWARE BACKUP FAILURE MECHANISM FOR MULTIPATH NEXT HOP SHRINKING

BACKGROUND

Multiple network devices may communicate with each other to provide their respective functionalities. For example, the network devices may send data representing information necessary for the multiple network devices to provide their functionalities.

BRIEF DESCRIPTION OF DRAWINGS

Certain embodiments will be described with reference to the accompanying drawings. However, the accompanying drawings illustrate only certain aspects or implementations of the disclosed embodiments by way of example and are not meant to limit the scope of the claims.

FIG. 1.1 shows a diagram of a system in accordance with one or more embodiments disclosed herein.

FIG. 1.2 shows a diagram of a network device in accordance with one or more embodiments disclosed herein.

FIG. 1.3 shows a diagram of a switching system in accordance with one or more embodiments disclosed herein.

FIG. 1.4 shows a diagram of forwarding hardware in accordance with one or more embodiments disclosed herein.

FIG. 1.5 shows a diagram of a next hop group table in accordance with one or more embodiments disclosed herein.

FIG. 1.6 shows a diagram of a next hop entry table in accordance with one or more embodiments disclosed herein.

FIG. 1.7 shows a diagram of a link state table in accordance with one or more embodiments disclosed herein.

DETAILED DESCRIPTION

Figure 2:
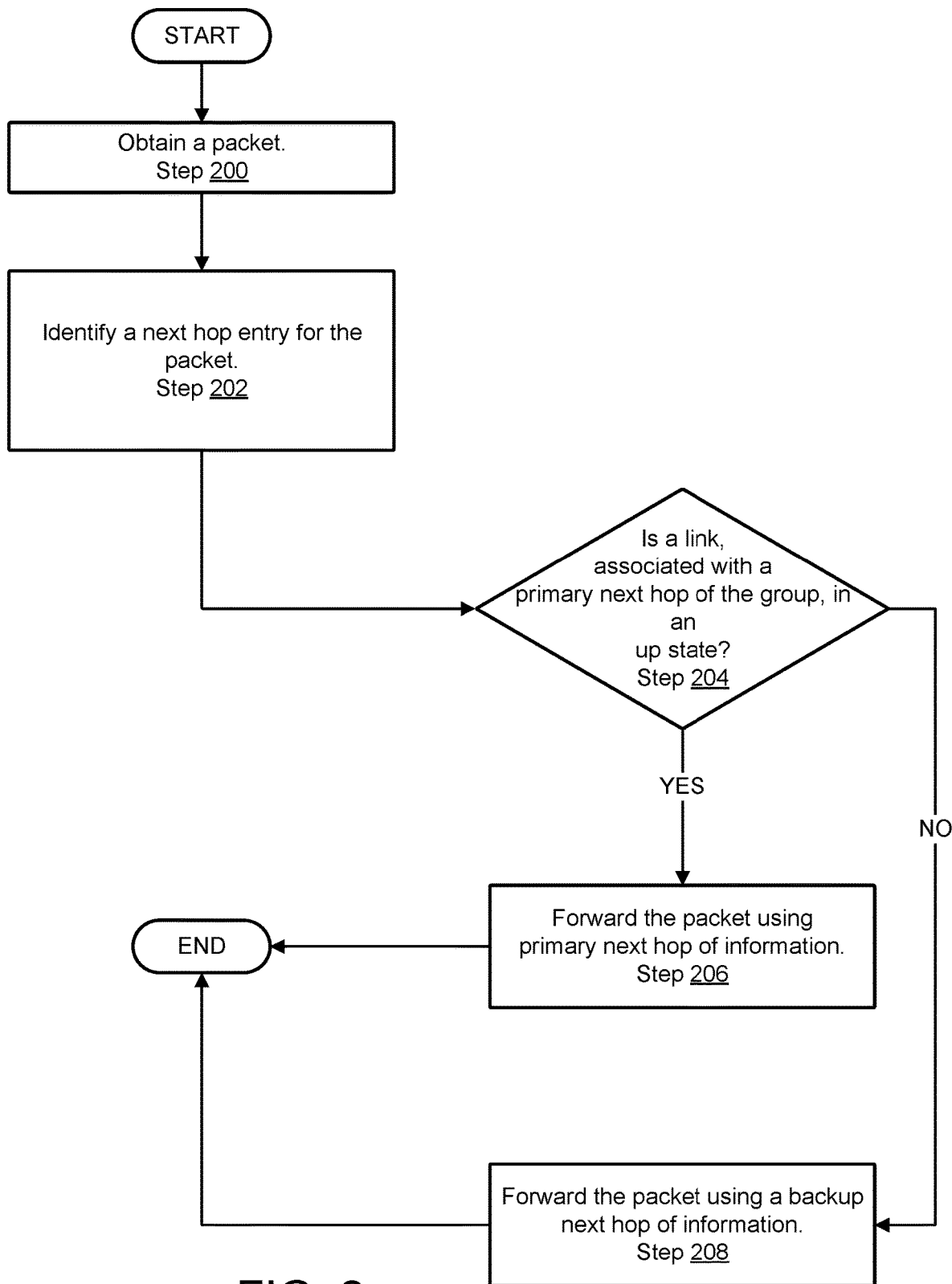
FIG. 2 shows a flowchart of a method of forwarding packets in accordance with one or more embodiments disclosed herein.

Networks facilitate the transmission of packets from a source computing device to a target computing device. The transmission of packets includes receiving a packet by a network device in the network and then determining to which network device (also referred to as a "next hop") to forward the packet, with the ultimate goal of transmitting the packet to the target computing device.

A network device uses a portion of a packet header (e.g., the destination Internet Protocol (IP) address) to identify the next hop. In some network devices, there is only one next hop that is identified using, e.g., the destination IP address. However, in other network devices, the network device may be connected to other network devices such that there are multiple equivalent next hops that may be used. In such scenarios, the destination IP address is used to identify a next hop group. A next hop group includes members, where each member is a next hop to which the packet may be transmitted. Once the next hop group is identified, a specific member in the next hop group is selected. The selection of the member in the next hop group may be performed using equal cost multi-path (ECMP) or unequal cost multi-path (UCMP).

If ECMP is being implemented, each member in the next hop group has an equal likelihood of being selected. If UCMP is being implemented, then the members in the next hop group are all assigned weights and the likelihood of a given member being selected is proportional to its assigned weight.

In the event that the membership of the next hop group decreases (or shrinks) (e.g., when a link associated with a given member of the next hop group goes down), then the network operating system on the network device initiates a reconfiguration of the next hop group. This reconfiguration of the next hop group may take a certain period of time (referred to as a "black hole window"). Conventionally, during the black hole window at least a portion of the packets that are to be processed using the next hop group are dropped. The following is an example to illustrate this issue.

Consider a scenario in which a network device implements a next hop group with four members (e.g., NH1, NH2, NH3, NH4) using ECMP. In this example assume that a packet (P1) is received by the network device and that the next hop group is identified using the destination IP address of P1. In order to select a specific member in the next hop group a function (e.g., a hash function) is applied to the header (or portion thereof) of P1 to identify one of NH1, NH2, NH3, NH4. Because there are four members in the next hop group, the function is configured to identify one of NH1, NH2, NH3, and NH4. At some later point in time assume that a link between the network device and NH2 goes down (i.e., packets can no longer be transmitted between the network device and a port associated with NH2). In response to detecting that the link between the network device and NH2 is down, the network operating system on the network device initiates reconfiguration of the next hop group to only include NH1, NH3, and NH4.

While the aforementioned reconfiguration is occurring, the network device may receive another packet (P2). In this example assume that the next hop group is identified using the destination IP address of P2. Because the reconfiguration is not completed at this time, in order to select a specific member in the next hop group the function is applied to the header (or portion thereof) of P2 to identify one of NH1, NH2, NH3, NH4. If NH2 is selected (which may occur 25% of the time), then P2 may be dropped (or otherwise not sent to NH2) as the link between the network device and NH2 is down.

In order to address the aforementioned issue of packet drop during the black hole window, embodiments herein describe a hardware failover mechanism. Specifically, in one or more embodiments, a next hop group may be configured with a backup mapping (also referred to as an internal backup mapping). In the internal backup mapping, each member in the next hop group is assigned an internal backup member (also referred to a backup next hop), where the internal backup member is another member in the next hop group. The internal backup mapping may be implemented in the network device hardware. Using the internal backup mapping, no packets (or substantially fewer packets) are dropped during the black hole window. Specifically, during the black hole window, if a member associated with the down link is selected, the packet is transmitted to the selected member's internal backup next hop.

By implementing internal backup mappings, embodiments enable an accelerated hardware failover mechanism that enables the network device to continue to use the next hop group (which specifies a member that will be removed once reconfiguration is completed) to process packets while the network device operating system is reconfiguring the network device.

In the text that follows, a description of components of a system in accordance with embodiments disclosed herein is provided with respect to FIGS. 1.1-1.4. A description of data structures that may be used by the system of FIG. 1.1 is provided with respect to FIGS. 1.5-1.7.

Following the description of the data structures, a description of methods that may be performed by components of the system of FIG. 1.1 is provided with respect to FIG. 2. Lastly, a description of a computing device that may be used to implement the system of FIG. 1.1 is provided with respect to FIG. 3.

FIG. 1.1 shows a diagram of an example system in accordance with one or more embodiments described herein. The system may include clients (e.g., 10, 12) that utilize services provided by network (20). The services provided by the network (20) may include, for example, network forwarding services for packets transmitted by clients (e.g., 10, 12). By forwarding packets (e.g., by providing packet forwarding services), network (20) may enable clients (e.g., 10, 12) to communicate with other devices.

To forward packets, network (20) may include network devices (22). Network devices (22) may be physical devices connected to any number of other devices. The network devices (22) may include functionality to (i) forward packets, (ii) obtain information regarding the network environment in which network devices (22) reside, and (iii) use the obtained information regarding the network environment to decide how to forward the packets. Network devices (22) may include any number of network devices and other types of devices. Network (20) is illustrated in FIG. 1.1 as including a specific number and arrangement of network devices for explanatory purposes only. In FIG. 1.1, operable connections are illustrated using lines terminated in arrows.

The arrangement of network device (22) in FIG. 1.1 may enable client A (10) to send packets to client B (12). For example, client A (10) may send a packet destined for client B (12) to network device A (24). Network device A (24) may, based on its understanding of the network environment (e.g., it being connected to both network device B (26) and network device (C) (28), and these network devices being connected to client B (12)) and the control information included in the packet, determine that the packet should be forwarded to network device B (26). In turn, network device B (26) may forward the packet to client B (12).

Any of the components of FIG. 1.1 may be connected by any combination and/or number of wired and/or wireless connections.

As discussed above, the system of FIG. 1.1 may include network devices (e.g., 24, 26, 28) that may provide packet forwarding services. Any of the devices of FIG. 1.1 may be implemented using computing devices. The computing devices may include, for example, mobile phones, tablet computers, laptop computers, desktop computers, servers, switches, and/or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing devices to perform the functions described in this application and/or all, or a portion, of the methods illustrated in FIG. 2. The devices of FIG. 1.1 may be implemented using other types of computing devices without departing from the embodiments disclosed herein. For additional details regarding computing devices, refer to FIG. 3.

The devices of FIG. 1.1 may be implemented using logical devices without departing from the embodiments disclosed herein. For example, the devices of FIG. 1.1 may be implemented using virtual machines (or other types of logical entities) that utilize computing resources (e.g., provided by hardware devices) of any number of physical computing devices to provide their respective functionalities. Thus, a logical entity may be an entity that, for example, shares various hardware devices when providing its functionality. The devices of FIG. 1.1 may be implemented using other types of logical devices without departing from the embodiments disclosed herein.

In one or more embodiments disclosed herein, the network devices are implemented as switching devices such as switches or multilevel switches. A switching device may be a device that is adapted to facilitate network communications. A switching device may include a computing device.

While the system of FIG. 1.1 has been illustrated and described as including a limited number of specific components, a system in accordance with embodiments disclosed herein may include additional, fewer, and/or different components than those illustrated and described.

To further clarify aspects of network devices, a diagram of network device (100) is provided in FIG. 1.2. Any of the network devices of FIG. 1.1 may be similar to network device (100) illustrated in FIG. 1.2.

FIG. 1.2 shows a diagram of network device (100) in accordance with one or more embodiments described herein. Network device (100) may facilitate network communications. To do so, network device (100) may provide any number of functionalities, including packet forwarding functionality. Packet forwarding functionality may include (i) programming hardware devices (e.g., packet processors) which may be used to forward packets, (ii) obtaining information regarding the network environment in which network device (100) resides and through which packets may traverse, and (iii) forwarding packets using the hardware devices.

To provide packet forwarding functionality, network device (100) may include ports (102), switching system (106) that switches packets between ports (102), switching system manager (108) that manages the operation of switching system (106), and/or data structures stored in storage (110) maintained by switching system manager (108). Each of these components of network device (100) is discussed below.

Ports (102) may facilitate obtaining of packets from other devices. For example, ports (102) may be adapted to connect to other devices (e.g., may receive cabling to another device). Ports (102) may obtain packets from other devices via the operable connections. The ports (102) may be associated with corresponding communication endpoints.

Ports (102) may also facilitate providing of packets to other devices. The ports (102) may provide the packets to other devices via the operable connections facilitated by the ports (102).

Switching system (106) may forward packets obtained via the ports (102) to other devices via the ports (102). For example, switching system (106) may direct packets received via one of ports (102) towards another of ports (102). Each of these ports may be connected to other devices. Consequently, switching the packets between these ports may cause the packets to be transmitted from a first device to a second device connected by the ports. Switching system (106) may selectively direct (e.g., switch) the packets in a manner that facilitates controlling the flow of packets across the network illustrated in FIG. 1.1.

For example, if a packet is transmitted by client A (10, FIG. 1.1) towards client B (12, FIG. 1.1), there may be multiple paths that the packet may take through network devices (22, FIG. 1.1) to reach client B (12). A switching system of any of network devices (22, FIG. 1.1) may be programmed to, for example, direct the packet toward client B (12) using an efficient path (e.g., lower latency), direct the packet toward client B (12) using a less used path to distribute packets across the network devices of network (20, FIG. 1.1.), and/or for other purposes.

Switching system (106) may be programmable. How switching system (106) is programmed may determine how network device (100) switches and/or forwards packets. For example, switching system (106) may receive data and make decisions regarding how to forward packets based on the data, the packets, and/or one or more algorithms for making switching decisions. For additional details regarding switching system (106), refer to FIG. 1.3.

Switching system manager (108) may manage the operation of switching system (106). Switching system manager (108) may manage the operation of switching system (106) by (i) updating, (ii) programing, and/or (iii) reprogramming the packet processors (or other devices that make packet forwarding decisions) of switching system (106). By doing so, switching system manager (108) may change the forwarding behavior of network device (100) by changing out of which ports received packets are sent (e.g., after an update, programming, reprogramming).

To manage the operation of switching system (106), switching system manager (108) may (i) monitor the operation of switching system (106), (ii) obtain information regarding the network environment in which network device (100) resides, and/or (iii) determine how to modify the operation of switching system (106) (e.g., by reprogramming/programming packet processors) based on the information obtained by switching system manager (108).

The process of determining how to modify the operation of switching system (106) may be time consuming. Consequently, switching system manager (108) may program the network processors (or other devices tasked with making packet switching decisions) to automatically and/or quickly respond to changes in network topology (e.g., respond to changes in network topology without needing to be reprogrammed) in anticipation of a change in network topology. By pre-programming the packet processors in anticipation of a change in network topology, the amount of packet loss that may be experienced while the packet processor is being reprogrammed in response to a shrinking membership of a next hop group may be significantly reduced.

In one or more embodiments disclosed herein, switching system manager (108) is implemented using a hardware device including circuitry. Switching system manager (108) may include, for example, a digital signal processor, a field programmable gate array, and/or an application specific integrated circuit. The circuitry of the hardware devices may be adapted to provide the functionality of switching system manager (108). Switching system manager (108) may be implemented using other types of hardware devices without departing from embodiments disclosed herein.

In one or more embodiments disclosed herein, switching system manager (108) is implemented using computing code stored on a persistent storage that when executed by a processor causes the processor to perform the functionality of switching system manager (108). The processor may be a hardware processor including circuitry such as, for example, a central processing unit or a microcontroller. The processor may be other types of hardware devices for processing digital information without departing from the embodiments disclosed herein.

In one or more embodiments disclosed herein, storage (110) is implemented using devices that provide data storage services (e.g., storing data and providing copies of previously stored data). The devices that provide data storage services may include hardware devices and/or logical devices. For example, storage (110) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/volatile storage).

For example, storage (110) may include a memory device (e.g., a dual in line memory device) in which data is stored and from which copies of previously stored data are provided. In another example, storage (110) may include a persistent storage device (e.g., a solid state disk drive) in which data is stored and from which copies of previously stored data is provided. In a still further example, storage (110) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

Storage (110) may store data structures including the information discussed above. For example, storage (110) may store switching system repository (112). Switching system repository (112) may be implemented using one or more data structures that store information regarding the operation of switching system (106) and/or information regarding the network environment in which network device (100) resides. The stored information may be used by switching system manager (108) to modify the operation of switching system (106).

For example, switching system repository (112) may include information regarding the network environment in which network device (100) is disposed, information regarding how switching system (106) is programmed, and/or other types of information. The information included in switching system repository (112) may include any type and quantity of information, the information may be obtained and/or be updated by switching system manager (108) and/or other entities, and may include additional, different, and/or less information without departing from embodiments disclosed herein.

To determine how to switch packets, switching system manager (108) may perform one or more algorithms (e.g., a best path selection algorithm, network traffic distribution/balancing algorithm, etc.). The algorithms may take, as input, information included in switching system repository (112) (e.g., network topology/connectivity information). The output of the algorithms may be information that may be used to program switching system (106) to cause packets to be switched by switching system (106) in a desirable manner (e.g., in accordance with a predetermined method for forwarding packets that an administrator or other person may have selected). Additionally, the output of the algorithms may include information about how switching system (106) should be programmed in the event of a different network state, such as a failure of one or more of links (105). The additional information may be changes, for example, to next hops for packets received by switching system (106).

In one or more embodiments disclosed herein, next hops include information regarding though which ports packets should be forwarded after being received by network device (100). Backup next hops may specify similar information but under hypothetical conditions. The hypothetical condition may be, for example, a failure of one or more of links (105). In other words, a change in topology of the network environment in which network device (100) resides. For additional details regarding use of backup next hops, refer to FIGS. 1.4-1.7 and FIG. 2.

While network device (100) of FIG. 1.2 has been illustrated as including a limited number of specific components, a network device in accordance with embodiments disclosed herein may include additional, fewer, and/or different components.

As discussed above, network device (100) may include a switching system. FIG. 1.3 shows a diagram of switching system (106) in accordance with one or more embodiments disclosed herein. Switching system (106) may facilitate switching of packets between any numbers of ports (102).

Switching packets in accordance with one or more embodiments disclosed herein may be a process of directing packets received on a first port to a second port of network device (100). The first port may be connected to a first device and the second port may be connected to a second device. Consequently, packets that are switched may be received from the first device and transmitted toward the second device.

The packets may be switched based on, for example, the destinations of the packets and the programming of programmed forwarding hardware (132) of packet processors (e.g., 130A, 130N). For example, when a packet is received, control information of the packet may be used to identify how to switch the packet. One or more algorithms implemented by the packet processors (130A, 130N) may be used to match or otherwise link the control information to information that has been programmed into the programmed forwarding hardware (132) of the packet processors. The packets may be switched based on additional and/or different information without departing from embodiments disclosed herein.

To perform switching, packet processors (130A, 130N) may obtain packets from ports (102) (e.g., sent by other devices connected to the ports via links (105A, 105L, 105N, 105Q, 105S), use their programmed forwarding hardware (132) to determine out of which port to send each respective packet, and direct each of the respective packets towards the determined ports. Consequently, the packets may be sent to other devices via links connected to the determined ports.

For example, a packet may be received from another device via link A (105A). Link A (105A) may be connected to one of the ports (102). That port may be connected to packet processor A (130A). Packet processor A (130A) may use control information of the packet and its programmed forwarding hardware (e.g., 132) to ascertain that the packet should be sent along link S (105S) to another device. To do so, the forwarding hardware (132) may specify out of which of the ports (102) the packet should be sent. Packet processor A (130A) may then send the packet out of that port so that the packet traverses link S (105S) towards the other device.

The determination made by packet processor A (130A) is based on the programming of its programmed forwarding hardware (e.g., 132). Consequently, changing the programming of programmed forwarding hardware (132) or updating the operation of the packet processors may update the forwarding behavior of network device (100, FIG. 1.2).

To enable the packet processors (130A, 130N) to quickly respond to changes in network topology, programmed forwarding hardware (132) may include information that may be used to modify packet switching decisions based on changes in link states (e.g., in response to link failures). For example, if a link fails, programmed forwarding hardware (132) may already include information that specifies how packets should be forwarded after failure of that link. Consequently, rather than needing to reprogram programmed forwarding hardware (132) to reflect a link failure, packet processors (130A, 130N) may change their packet switching in response to a link failure by simply being made aware of the change in the link state. Once made aware of the change in the link state, the programmed forwarding hardware (132) may utilize pre-programmed information to make packet switching decision thereby changing the packet switching behavior of the switching system (106). For additional details regarding the programming of programmed forwarding hardware (132), refer to FIGS. 1.4-1.7.

Packet processors (130A, 130N) may be implemented using one or more physical devices. A physical device (e.g., a chip, die, etc.) may include circuitry adapted to perform the functionality of packet processors (130A, 130N). In some embodiments disclosed herein, the circuitry may include programmable portions (e.g., programmed forwarding hardware) that may be adapted to execute computing instructions (e.g., computer code) that cause the programmable portions of the circuitry to perform all, or a portion, of the functionality of packet processors (130A, 130N).

For example, programmed forwarding hardware (132) may implement a packet processing pipeline that enables rapid switching determinations to be made. The packet processing pipeline may enable control information of the packets to be matched to information included in the programmed forwarding hardware (132) to determine how to switch the packets. The programming pipeline may, for example, implement predetermined algorithms for making forwarding decisions that are adapted based on the information programmed into programmed forwarding hardware (132). Consequently, the forwarding decisions made by the forwarding pipeline may be adapted to meet various network topologies.

The switching system (106) may include any number of packet processors. Each of the packet processors may process packets obtained from any number of ports.

Switching system (106) may perform all, or a portion, of the methods illustrated in FIG. 2 as part of providing the aforementioned functionality.

While packet processors (130A, 130N) have been illustrated as including a limited number of specific components, a packet processor in accordance with embodiments disclosed herein may include additional, fewer, and/or different components than those illustrated in FIG. 1.3.

While switching system (106) of FIG. 1.3 has been illustrated as including a limited number of specific components, a switching system may include additional, fewer, and/or different components without departing from embodiments disclosed herein.

As discussed above, packet processors may switch packets based on the programming of programmed forwarding hardware (132). FIG. 1.4 shows a diagram of programmed forwarding hardware (132) in accordance with one or more embodiments disclosed herein.

As discussed above, programmed forwarding hardware (132) may perform one or more algorithms to determine how to switch packets. The algorithms may utilize information that is programmed into programmed forwarding hardware (132) to make those decisions.

For example, programmed forwarding hardware (132) may include programmable lookup tables (150). The algorithms employed by programmed forwarding hardware (132) may operate on entries of the lookup tables (150) when deciding how to switch packets. The lookup tables (150) may include any number of entries. Each of the entries may include any number of fields. The fields may include any number of sub-fields.

For example, the algorithms employed by programmed forwarding hardware (132) may first match control information (and/or encapsulation headers or other types of control information added to the packet) of a packet to information in a table of the lookup tables to classify a packet. The classification may be stored in a field of an entry of the table. The entry of the table may also include information that may be matched against the control information (and/or other types of information that may be appended to the packet for control purposes such as labels, headers, etc.).

The classification may then be matched to information included in other tables to identify, for example, out of which port to send the packet, encapsulation information to add to the packet, and/or other steps of switching a packet.

Lookup tables (150) may include any number of tables used by the algorithms employed by programmed forwarding hardware (132) to determine how to switch and forward packets. In FIG. 1.4, only a limited number of the tables used by programmed forwarding hardware (132) are illustrated for brevity. These lookup tables (150) may include, for example, next hop group table (160) and link state table (170). Each of these tables is discussed below.

Next hop group table (160) may include information used to determine how to forward packets. The information may include next hops usable to forward packets.

The information may also include backup next hops that are to be used, for switching purposes, upon the occurrence of a failure of a link associated with another next hop. Consequently, next hop group table (160) may include information that may be used to switch packets based on two different network states (e.g., one in which a link is in an up state—supporting an operable connection; and one in which a link is failed—does not support an operable connection). For additional details regarding next hop group table (160), refer to FIGS. 1.5-1.6.

Link state table (170) may include information regarding the state of any number of links. For example, when a link state changes (e.g., link fails or is otherwise unable to transmit packets), link state table (170) may be updated to reflect the new state of the link. Link state table (170) and next hop group table (160) may be generated and/or maintained by switching system manager (108) and/or the switching system (106).

In one or more embodiments disclosed herein, the storage of the programmed forwarding hardware (132) is implemented using devices that provide data storage services (e.g., storing data and providing copies of previously stored data). The devices that provide data storage services may include hardware devices and/or logical devices. For example, the storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/volatile storage).

For example, the storage may include a memory device (e.g., a dual in line memory device) in which data is stored and from which copies of previously stored data are provided. In another example, the storage may include a persistent storage device (e.g., a solid state disk drive) in which data is stored and from which copies of previously stored data is provided. In a still further example, the storage may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

While programmed forwarding hardware (132) has been illustrated and described as including lookup tables (150), programmed forwarding hardware in accordance with embodiments disclosed herein may include different types of data structures that include additional, different, and/or less information.

Turning to FIG. 1.5, FIG. 1.5 shows a diagram of next hop group table (160) in accordance with embodiments disclosed herein.

Next hop group table (160) may be implemented as a table that includes any number of next hop group entries. Each next hop group entry (162) corresponds to a set of best paths (next hops) with equal routing priority for a given destination. Thus, a packet that matches to the next hop group may be forwarded towards the destination using any of the next hops specified in the next hop group entry. The next hop groups may correspond to Equal Cost Multi-Path (ECMP) groups or Unequal Cost Multi-Path (UCMP) groups. When the next hop group is an ECMP group, then each next hop in each of the next hop group entries is associated with the same weight. In contrast, when the next hop group is an UCMP group, then each next hop in each of the next hop group entries is associated with a different weight. The aforementioned weights are then used in the selection of the specific next hop to use to forward a given packet (see FIG. 2 for additional detail).

Continuing with the discussion of FIG. 1.5, next hop group entries (e.g., 164A, 164N) specify how to switch a packet depending on whether or not there is a link failure. For an example of a next hop group entry, refer to FIG. 1.6.

In one or more embodiments, the switching system manager (e.g., FIG. 1.2, 108) includes functionality to determine which next hops should be associated with a given next hop group. The determination of the membership of a given next hop group may be performed using any known or later discovered mechanism. Further, in scenarios in which the next hop group is a UCMP group, the switching system manager may also include functionality to determine and/or assign weights to each of the members (i.e., next hops) that are associated with the next hop group. The determination of the weights for each of the next hops in a UCMP group may be performed using any known or later discovered mechanism.

Turning to FIG. 1.6, FIG. 1.6 shows a diagram of example next hop group entry (180). Any of the next hop group entries of FIG. 1.5 may be similar to example next hop group entry (180).

Example next hop group entry (180) includes two or more next hop entries (184A, 184N), where each of the next hop entries corresponds to a next hop that is a member of the next hop group (i.e., the next hop group associated with the next hop group entry). The next hop entry may include a link identifier (e.g., link identifier A, 186A) and next hop information (e.g., 185). The next hop information specifies a primary next hop (e.g., primary next hop A, 186B) and a backup next hop (e.g., backup next hop A, 186C). The primary next hop (e.g., 186A) specifies, in part, out of which port to send a packet while the link associated with primary next hop (186A) is up. Backup next hop (e.g., 186B) specifies, in part, out of which port to send a packet while the link associated with primary next hop (186A) is down (e.g., inoperable). The link identifier in the next hop entry identifies the link associated with the primary next hop in the next hop entry. As is discussed below with respect to FIG. 1.7, the inclusion of the link identifier in the next hop entry enables the programmed forwarding hardware to readily determine the status of the link associated with the primary next hop.

The next hop information for a given next hop entry may be generated by the switching system manager or by another process executing on the network device. Each next hop entry is first associated with a primary next hop. The backup next hop is then selected from the other members of the next hop group. Said another way, if the next hop group includes NH 1, NH2, NH3, and NH4, and the primary next hop in a next hop entry is NH1, then the backup next hop is selected from one of NH2, NH3, and NH4. In one or more embodiments, each next hop in the next hop group may only be specified as a backup next hop in one of the next hop entries in the next hop group entry. Thus, continuing with the above example, if NH2 is selected as a backup next hop for NH1, then NH2 may not be specified as a backup next hop for any of NH3 and NH4. Further, the primary next hop and the backup next hop in a given next hop entry are different (i.e., the same next hop may not be specified as both the primary next hop and the backup next hop).

When the next hop group is an ECMP group, then the selection of a backup next hop for a given primary next hop may be selected using a random selection scheme, a round robin selection scheme, any other scheme, or any combination thereof.

When the next hop group is a UCMP group, then the selection of the back up next hop for a given primary next hop takes into account the weights associated with the next hops in the UCMP group. More specifically, the next hops are grouped based on their associated weights to obtain subgroups, where next hops with similar weights are grouped together. The determination of whether a given set of next hops should be grouped together may be based on a user defined heuristic, a grouping algorithm, any other scheme for grouping together next hops with similar weights, or any combination thereof. Once the subgroups are defined, the selection of a backup next hop for a given primary next hop may be selected from the members of the subgroups of which there are members using a random selection scheme, a round robin selection scheme, any other scheme, or any combination thereof.

The use of subgroups in the UCMP scenario minimizes the skew of network traffic in failover scenarios. For example, by creating subgroups with similar weights, when a failover occurs the backup next hop will have substantially the same properties as the original next hop and, as such, the traffic will continue to be forwarded using the next hop group after the failure has occurred in substantially the same manner as prior to the failure occurring.

Group Example—UCMP

This following example is intended to illustrate various aspects of the technology and not intend to limit its scope. Turning to the example, consider a scenario in which the network device implements UCMP. In this example, the backup mappings for UCMP are determined by: (i) grouping members into higher weight and lower weight groups and (ii) performing a random selection of internal backup members from within the aforementioned groups identified in (i).

With respect to this example, consider the following next hop group: NH1 (W:10), NH2 (W:8), NH3(W:4), NH4 (W:4), and NH5 (W:2). In this example, NH1 and NH2 are grouped together in the higher weight subgroup and NH3, NH4, NH5 are grouped together in the lower weight subgroup. Following these initial subgroupings, the backup mapping may be as follows: NH1→NH2, NH2→NH1, NH3→NH5, NH4→NH3, NH5→NH4.

End of Example

Turning to FIG. 1.7, FIG. 1.7 shows a diagram of link state table (170) in accordance with one or more embodiments of the disclosure. Link state table (170) includes information specifying the status of any number of links.

Link state table (170) may include any number of entries (172, 174). Entries (172, 174) of link state table (170) may each specify a corresponding link identifier (172A) and link status (172B). Link identifier (172A) may be an identifier of the link associated with the entry.

As discussed above, entries of next hop group table (160) may reference an entry of link state table (170). For example, entries of next hop group table (160) may include a copy of a link identifier corresponding to the entry of link state table (170) that specifies link status (172B) of the link associated with primary next hop (see e.g., FIG. 1.6, 186B). Consequently, when link status (172B) is modified, any number of entries of next hop group table (160) may determine that a backup next hop, rather than a primary next hop, should be used for packet forwarding purposes.

The switching system (e.g., 106, FIG. 1.2) may include functionality to detect a failure of a link and update the link state table. The switching system (e.g., 106, FIG. 1.2) may detect the link failure using any known (e.g., network discovery) or any later discovered link failure detection mechanism.

While the data structures illustrated in FIGS. 1.4-1.7 have been illustrated as including a limited amount of specific information, any of the data structures may include additional, different, and/or less information without departing from embodiments disclosed herein.

Turning to FIG. 2, FIG. 2 shows a flowchart describing a method for forwarding packets in accordance with one or more embodiments disclosed herein. More specifically, FIG. 2 describes how the network device processes packets. The method may be performed by, for example, packet forwarding hardware (e.g., 132, FIG. 1.3). Other entities in the network device may perform the method of FIG. 2 without departing from embodiments disclosed herein.

While the various steps in the flowchart shown in FIG. 2 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 200, a packet is obtained. The packet may be obtained by receiving via a first port.

In step 202, a next hop entry associated with the packet is identified. In one or more embodiments, the identification of the next hop entry may include: (i) determining a longest prefix match (LPM) for the packet, e.g., utilizing a destination Internet Protocol (IP) address included in the IP header of the received packet, to ultimately identify (directly or indirectly via one or more intermediate lookup tables (e.g., 150, FIG. 1.4)) a next hop group entry (e.g., 164A, FIG. 1.5) and (ii) selecting a next hop entry from the set of next hop entries in the identified the next hop group entry. The selection of the next hop entry may be performed using any known or later discovered selection mechanism. If the next hop group is a UCMP group, then the selection also takes into account the weights associated with each of the primary next hops specified in the next hop entries.

In step 204, a determination is made about whether a link associated with a primary next hop of the next hop information, is in an up state. The determination may be made based on information included in a link state table entry. The link state table entry may be associated with the next hop entry identified in step 202. The link state table entry may specify whether the link is up or down. For example, the link identifier in the identified next hop entry may be obtained and used to perform a lookup in the link state table to determine the link status of the link associated with the link identifier.

Continuing with the discussion of FIG. 2, if it is determined that the link is in an up state, the method may proceed to step 206. If it is determined that the link is not in an up state (e.g., a down state), the method may proceed to step 208.

In step 206, the packet is forwarded using the primary next hop of the next hop information. For example, the packet may be directed towards a port specified by or associated with (e.g., the primary next hop may reference another table that specifies the port and/or other information used to forward the packet) the primary next hop.

The method may end following step 206.

Returning to step 204, the method may proceed to step 208 following step 204 if it is determined that the link is not in an up state.

In step 208, the packet is forwarded using a backup next hop of the next hop information. For example, the packet may be directed towards a port specified by or associated with the backup next hop.

The method may end following step 208.

The method shown in FIG. 2 enables the network device to continue to transmit packets using the next hop even when there is a change in the link status associated with a next hop in the next hop group. The method shown in FIG. 2 will continue to be executed until such time as the network device updates the membership of the next hop group and then reprograms one or more lookup tables (e.g., 105, FIG. 1.4) to reflect the updated next hop group membership.

Figure 3:
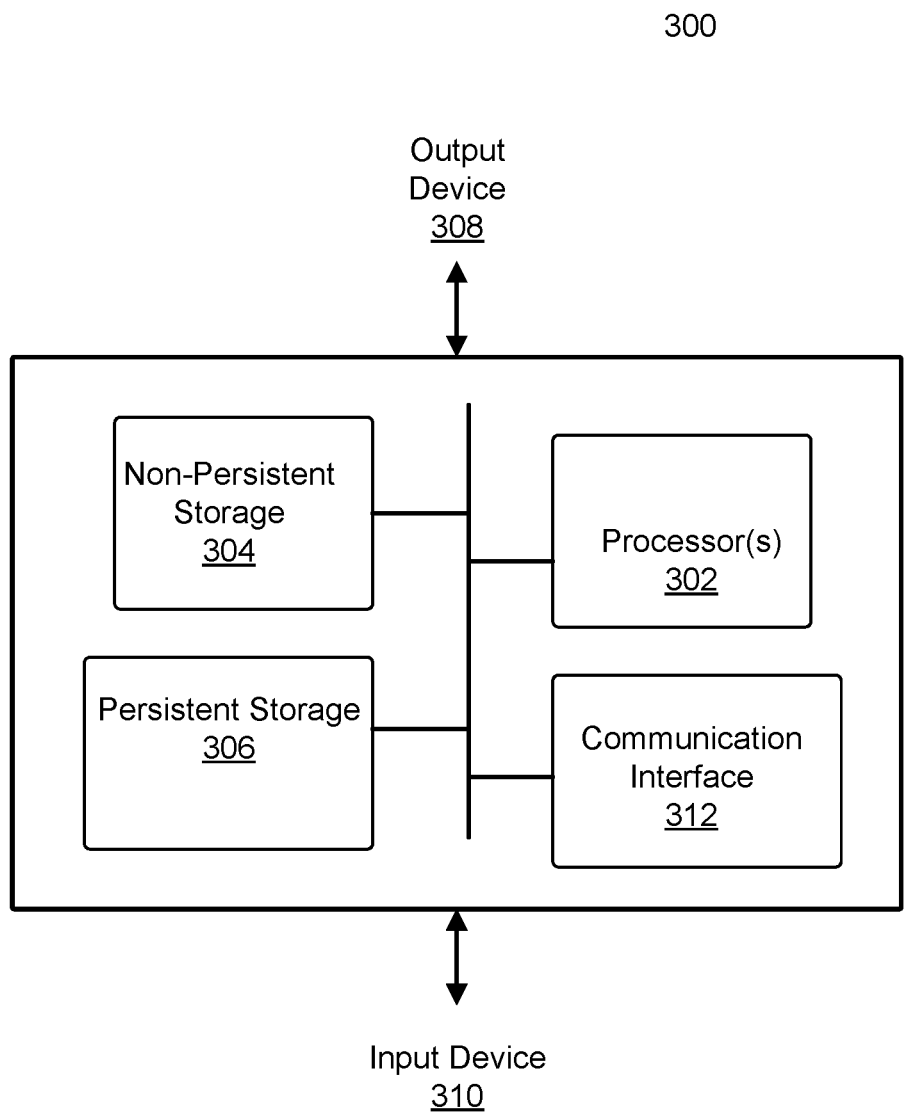
FIG. 3 shows a diagram of a computing device in accordance with one or more embodiments disclosed herein.

FIG. 3 shows a diagram of a computing device in accordance with one or more embodiments disclosed herein. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment disclosed herein, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment disclosed herein, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

Example

For example, consider a scenario in which a network device implements a next hop group with four members (NH1, NH2, NH3, NH4) using ECMP and has the following internal backup mappings: NH1→NH2, NH2→NH3, NH3→NH4, NH4→NH1.

In this example assume that a link between the network device and NH2 goes down (i.e., packets can no longer be transmitted between the network device and NH2). In response to detecting that the link between the network device and NH2 is down, the network operating system on the network device initiates reconfiguration of the next hop group to only include NH1, NH3, and NH4. While the aforementioned reconfiguration is occurring, the network device may receive a packet (P). In this example assume that the next hop group is identified using the destination IP address of P. Because the reconfiguration is not completed at this time, in order to select a specific member in the next hop group, a function (e.g., a hash function) is applied to the header (or portion thereof) of P to identify one of NH1, NH2, NH3, NH4. If NH2 is selected, then a determination is made that the link to NH2 is down and, as such, P1 should be transmitted to NH2's backup next hop (i.e., NH3). P1 is subsequently transmitted to NH3.

End of Example

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase connected, or connection, means that there exists between elements/components/devices a direct or indirect connection that allows the elements to interact with one another in some way. For example, the phrase 'connected' may refer to any direct (e.g., wired directly between two devices or components) or indirect (e.g., wired and/or wireless connections between any number of devices or components connecting the connected devices) connection. Thus, any path through which information may travel may be considered a connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for processing packets in a network device, comprising:
   determining that a packet received by the network device is to be processed using a next hop group having at least a member associated with a second network device and a second member associated with a third network device;
   selecting the member of the next hop group for transmission of the packet to the second network device;
   in response to determining that a link between the second network device associated with the member of the next hop group and the network device is down, transmitting the packet to the third network device associated with the second member of the next hop group; and
   updating a membership of the next hop group to exclude the member, wherein, after determining that the link between the second network device and the network device is down and prior to updating the membership of the next hop group, transmission of the packet and any additional packets, for which the member is selected for packet processing, occurs via the second member to the third network device.

2. The method of claim 1, further comprising:
   specifying the second member as a backup next hop of the member prior to receiving the packet.

3. The method of claim 1, wherein the packet is received after the link between the second network device and the network device is down.

4. The method of claim 1,
   wherein the next hop group comprises a plurality of members;
   wherein the member is one of the plurality of members;
   wherein the second member is one of the plurality of members; and
   wherein each of the plurality of members is associated with its own backup next hop selected from other members of the plurality of members.

5. The method of claim 1, wherein the second member is selected to be a backup member of the member using a random selection scheme.

6. The method of claim 1, wherein the second member is selected to be a backup member of the member using a round robin selection scheme.

7. The method of claim 1, wherein the next hop group is an equal cost multi-path group.

8. The method of claim 1, wherein the next hop group is an unequal cost multi-path group.

9. The method of claim 8, wherein the member and the second member are higher weight members of the next hop group.

10. The method of claim 8, wherein the member and the second member are lower weight members of the next hop group.

11. A network device for forwarding packets as part of a network comprising a second network device connected to the network device via a link and a third network device connected to the network device via a second link, comprising:
    ports, wherein a port of the ports is connected to the second network device via the link and a second port of the ports is connected to the third network device via the second link; and
    a packet processor programmed to:
      identify a failure of the link;
      in response to identifying the failure of the link, forward packets using the second link instead of the link, wherein the link is associated with a primary next hop and wherein the second link is associated with a backup next hop for the primary next hop, wherein the packet processor is configured to store a next hop entry for the primary next hop that contains a link identifier for the link, the primary next hop, and the backup next hop and is configured to store a link state table entry that contains the link identifier and a link status of the link, and wherein the packet processor is programmed to identify the failure of the link by obtaining the link identifier from the next hop entry and performing a lookup using the link identifier to obtain the link status in the link state table entry.

12. The network device of claim 11, wherein the primary next hop and the backup next hop are members of a next hop group.

13. The network device of claim 12, wherein the next hop group is an unequal cost multi-path group, wherein the primary next hop and the backup next hop are members of a subgroup, where all the members of the subgroup have similar weights.

14. The network device of claim 13, wherein the subgroup is one of a higher weight subgroup or a lower weight subgroup.

15. A method of forwarding packets by a network device of a network topology, comprising:

generating, for a next hop group, a next hop group entry comprising a plurality of next hop entries;

receiving, after generating, a packet;

making a first determination that the packet is associated with the next hop group;

in response to the first determination, selecting a next hop entry of the plurality of next hop entries;

making a second determination, using a link identifier in the next hop entry, that a link associated with a primary next hop in the next hop entry is down; and in response to the second determination, transmitting the packet towards a destination of the packet using a backup next hop in the next hop entry, wherein the backup next hop is associated with a second link.

16. The method of claim 15, wherein generating the next hop group entry comprises:

associating the primary next hop with the backup next hop, wherein the primary next hop and the backup next hop are members of the next hop group.

17. The method of claim 16, wherein the backup next hop is selected using a round robin selection scheme.

18. The method of claim 16, wherein the backup next hop is selected using a random selection scheme.

19. The method of claim 15, wherein the next hop group is an equal cost multi-path group or an unequal cost multi-path group.

20. The method of claim 15, wherein making the second determination, using the link identifier in the next hop entry, that the link associated with the primary next hop in the next hop entry is down comprises performing a lookup in a link state table, using the link identifier, to determine a link state table entry indicating a status of the link.

* * * * *